US005091257A

United States Patent [19]

Nonogaki et al.

[11] Patent Number: 5,091,257

[45] Date of Patent: Feb. 25, 1992

[54] THERMOSENSITIVE STENCIL PAPER

[75] Inventors: Masayasu Nonogaki, Numazu; Fumiaki Arai, Mishima; Yuji Natori, Numazu; Hideyuki Yamaguchi, Shizuoka, all of Japan

[73] Assignee: Ricoh Company, Ltd., Tokyo, Japan

[21] Appl. No.: 578,682

[22] Filed: Sep. 7, 1990

[30] Foreign Application Priority Data

Sep. 13, 1989 [JP] Japan ................................ 1-235817
Nov. 22, 1989 [JP] Japan ................................ 1-301926

[51] Int. Cl.[5] ................................ B32B 9/00

[52] U.S. Cl. ................................ 428/411.1; 428/537.5; 428/195; 428/913; 563/227

[58] Field of Search ............. 503/227; 428/195, 411.1, 428/537.5, 913

[56] References Cited

U.S. PATENT DOCUMENTS 3,922,445 11/1975 Mizuno et al. ................... 428/537.5
4,253,838 3/1981 Mizuno et al. ...................... 503/227

*Primary Examiner*—Patrick J. Ryan
*Attorney, Agent, or Firm*—Oblon, Spivak, McClelland, Maier & Neustadt

[57] ABSTRACT

A thermosensitive stencil paper in which a thermoplastic resin layer is formed on a porous tissue paper containing natural fibers therein, serving as a porous substrate, with plant elements contained in the porous tissue paper selected in such a fashion that (1) plant elements having a maximum width ranging from 100 $\mu m$ to 5 mm, a maximum length ranging from 100 $\mu m$ to 5 mm, and an area of 7800 $\mu m^2$ or more, when measured in a posture which provides a maximum area of the plant element are present in a number of 150 or less in a 100 $cm^2$ area of the porous tissue paper; and (2) plant elements having a maximum width ranging from 300 $\mu m$ to 5 mm, a maximum length ranging from 300 $\mu m$ to 5 mm, and an area of 70,000 $\mu m^2$ or more are present in a number of 25 or less in a 100 $cm^2$ area of the porous tissue paper.

2 Claims, No Drawings

THERMOSENSITIVE STENCIL PAPER

BACKGROUND OF THE INVENTION

1. Field of the Invention

The present invention relates to a thermosensitive stencil paper for printing, which comprises a porous tissue paper comprising different plant elements, serving as a porous substrate, and a thermoplastic resin layer formed thereon.

2. Discussion of Background

Conventional thermosensitive stencil paper is prepared by attaching a thermoplastic resin film to a porous substrate such as a porous tissue paper with an adhesive, for example, a pressure-sensitive adhesive, or providing a thermoplastic polymer layer on one side of a porous substrate such as a porous tissue paper.

To make a printing master using the above-mentioned thermosensitive stencil paper, an original is caused to adhere closely to the thermoplastic resin film or the thermoplastic polymer layer of the thermosensitive stencil paper, and infrared rays or light from a xenon flash tube is applied to the porous substrate side of the thermosensitive stencil paper to generate thermal energy at solid image areas of the original. In the thermoplastic resin film or thermoplastic polymer layer, the areas corresponding to the solid image areas of the original which closely adheres to the above resin film or polymer layer are melted by the thermal energy and the porous substrate is exposed at these areas. Thereafter, the original is peeled from the thermosensitive stencil paper to prepare the printing master.

Alternatively, while images formed on the original are read by an image sensor, the thermoplastic resin film or thermoplastic polymer layer of the thermosensitive stencil paper which closely adheres to the original is partially melted to correspond to the solid image areas on the original by the application of the thermal energy from a thermal head.

The thermosensitive stencil paper thus prepared is wound around a printing drum and printing ink is applied thereto from the porous substrate side to be ready for printing.

In the case where an original carries considerable information in character form, adequate printing quality can be obtained in the printed matter thereof using the printing master prepared from the thermosensitive stencil paper.

In contrast to this, conventional thermosensitive stencil paper cannot produce printed matter with a high printing quality in the case where an original which mostly includes solid areas is employed. Therefore, excellent printing quality is desired in printed matter which includes image information with many solid areas.

The applicability of a thermosensitive stencil paper to a printing operation with the original which includes many solid areas is considerably influenced by the ink-permeability of the porous substrate such as the porous tissue paper.

Some efforts have been made to improve the ink-permeability by the removal of the bonded fibers contained in the porous tissue paper of the thermosensitive stencil paper as disclosed in Japanese Laid-Open Patent Application 61-254396. However, when the above-mentioned improved thermosensitive stencil paper is used for printing, the printed matter obtained from the original tends to contain white spots in the solid black areas. The reason for this is that the uniformity of the ink absorbency of the thermosensitive stencil paper, which is one of the key features in solid printing, has not yet been improved, even though a cause of disturbance of the ink-permeation, that is, the above-mentioned bonded fibers in the paper, can be removed.

SUMMARY OF THE INVENTION

Accordingly, an object of the present invention is to provide a thermosensitive stencil paper capable of producing clear printed images, free from white spots in solid areas and broken lines in character images.

The above-mentioned object of the present invention can be achieved by a thermosensitive stencil paper which comprises (i) a porous tissue paper comprising a plurality of different plant elements (a) and (b), serving as a porous substrate, and (ii) a thermoplastic resin layer formed thereon, in which the plant elements (a) have a maximum width ranging from 100 $\mu m$ to 5 mm, a maximum length ranging from 100 $\mu m$ to 5 mm, and an area of 7800 $\mu m^2$ or more when measured in a posture which provides a maximum area of the plant element (a) and are present in a number of 150 or less in a 100 $cm^2$ area of the porous tissue paper; and the plant elements (b) have a maximum width ranging from 300 $\mu m$ to 5 mm, a maximum length ranging from 300 $\mu m$ to 5 mm, and an area of 70,000 $\mu m^2$ or more, when measured in a posture which provides a maximum area of the plant element, and are present in a number of 25 or less in a 100 $cm^2$ area of the porous tissue paper.

DESCRIPTION OF THE PREFERRED EMBODIMENTS

Various elements contained in the vegetable fibers which constitute the porous tissue paper of the thermosensitive stencil paper have a great influence on the image quality of the printed images.

Examples of the above-mentioned elements in the vegetable fibers are epidermal fibers, parenchyma cells, vessels, bonded fibers insoluble in water, and so on. In particular, the vegetable fibers include a large number of vessels, which exerts a great influence on the image quality of the printed images.

Each of the above-mentioned plant elements has a width ranging from 20 $\mu m$ to 2 mm and a length from 20 $\mu m$ to 5 mm.

It is conventionally considered that the printed image quality can be improved by simply eliminating extremely large influential constituent elements of the vegetable fibers from the porous tissue paper. Specifically, the large plant elements are pulverized in the preparation of the tissue paper. As a result, however, the number of pulverized fine elements (with a width of about 100 $\mu m$) is increased and the density of fiber in the porous tissue paper is excessively increased. Accordingly, the image quality of the printed images cannot be sufficiently improved.

It has been confirmed in the present invention that the influential plant elements, such as the vessels, contained in the vegetable fibers are of great importance in determining the uniform ink-permeability and the ink-absorbency of the porous tissue paper, and these elements become a significant factor in the prevention of white spots in solid areas.

Particularly, the constituent plant elements of the vegetable fibers contained in the porous tissue paper, which have a maximum width ranging from 100 $\mu m$ to 5 mm, a maximum length ranging from 100 μm to 5 mm, and an area of 7800 $\mu m^2$ or more when measured in a posture which provides a maximum area of the plant element have an important influence on the image quality of the printed images when such constituent elements are present in a number of 150 or less in a 100 $cm^2$ area of the porous tissue paper.

The thermosensitive stencil paper according to the present invention comprises a porous tissue paper comprising a plurality of different plant elements (a) and (b), serving as a porous substrate, and a thermoplastic resin layer formed thereon, with the plant elements (a) having a maximum width ranging from 100 μm to 5 mm, a maximum length ranging from 100 μm to 5 mm, and an area of 7800 $\mu m^2$ or more when measured in a posture which provides a maximum area of the plant element (a) being 150 or less in number in a 100 $cm^2$ area of the porous tissue paper; and the plant elements (b) having a maximum width ranging from 300 μm to 5 mm, a maximum length ranging from 300 μm to 5 mm, and an area of 70,000 $\mu m^2$ or more, when measured in a posture which provides a maximum area of the plant element (b), being 25 or less in number in a 100 $cm^2$ area of the porous tissue paper.

It is preferable that the porous tissue paper for use in the present invention further comprise plant elements having a maximum ranging from 300 μm to 5 mm, a maximum length ranging from 1 mm to 5 mm, when measured in a posture which provides a maximum area of the plant element, in a number of 15 or less in a 100 $cm^2$ area of the porous tissue paper.

The maximum width and maximum length defined in the aforementioned conditions refer to the maximum values obtained when an indeterminate form of each plant element is projected on a plane in a posture which provides a maximum area.

When the printing operation with an original which includes many solid areas is carried out using the thermosensitive stencil paper according to the present invention, the printed image quality is not visually affected by the plant elements contained in the porous tissue paper of the thermosensitive stencil paper in practical use, and the printed matter thus obtained has an excellent printed quality.

When a solid image is printed by use of the thermosensitive stencil paper according to the present invention, the number of white spots with a maximum width ranging from 100 μm to 5 mm, a maximum length ranging from 100 μm to 5 mm, and an area of 7800 $\mu m^2$ or more can be decreased to 150 or less in a 100 $cm^2$ area of a sheet of the printed matter, and at the same time, the number of white spots with a maximum width ranging from 300 μm to 5 mm, a maximum length ranging from 300 μm to 5 mm, and an area of 70,000 $\mu m^2$ or more can be decreased to 25 or less in a 100 $cm^2$ area of a sheet of the printed matter.

Furthermore, the number of white spots with a maximum width ranging from 300 μm to 5 mm and a maximum length ranging from 1 mm to 5 mm can also be decreased to 15 or less in a 100 $cm^2$ area of a sheet of the printed matter.

To satisfy the above-mentioned conditions in the porous tissue paper of the thermosensitive stencil paper according to the present invention, it is necessary to remove the plant elements of a specific size from the porous tissue paper by use of a cyclone or a screen.

More specifically, for example, the following tissue paper-making methods can be employed in the present invention:

(1) A sample pulp is controlled to have a concentration of 0.05%. The influential constituent elements of the vegetable fibers are then removed from the sample pulp using a cyclone with a diameter of 3 inch, with an input pressure of 2.0 kg/$cm^2$ and an output pressure of 0.5 kg/$cm^2$. Thus, a tissue paper having a basis weight of 10 g/$m^2$ is prepared, and is used as a porous substrate for the thermosensitive stencil paper.

(2) A sample pulp is controlled to have a concentration of 0.05%. A tissue paper is then made of the above sample pulp using a 20 mesh/inch screen. The tissue paper prepared in this manner is used as a porous substrate for the thermosensitive stencil paper.

Other methods for making the tissue paper can be employed as far as the tissue paper satisfies at least the above-mentioned conditions (1) and (2).

It is preferable that the basis weight of the tissue paper for use in the present invention be in the range of 4 to 15 g/$m^2$.

Other features of this invention will become apparent in the course of the following description of exemplary embodiments, which are given for illustration of the invention and are not intended to be limiting thereof.

EXAMPLE 1

The content of the plant elements in the pulp was controlled so that a tissue paper having a basis weight of 10 g/$m^2$ was obtained, in which the number of plant elements with a width ranging from 100 μm to 5 mm, a length ranging from 100 μm to 5 mm, and an area of 7800 $\mu m^2$ or more when measured in a posture which provides a maximum area of the plant element was decreased to 59; the number of plant elements with a width ranging from 300 μm to 5 mm, a length ranging from 300 μm to 5 mm, and an area of 70,000 $\mu m^2$ or more when measured in a posture which provides a maximum area of the plant element was decreased to 22; and the number of plant elements with a width ranging from 300 μm to 5 mm and a length ranging from 1 to 5 mm when measured in a posture which provides a maximum area of the plant element was decreased to 3 in a 100 $cm^2$ area of the obtained tissue paper.

The above prepared tissue paper and a PET film having a thickness of 2 μm were laminated with a vinyl acetate type adhesive. A silicone oil was then applied to the PET film, so that a thermosensitive stencil paper No. 1 according to the present invention was prepared.

The above thermosensitive stencil paper No. 1 was wound around a drum of a commercially available printing machine, "Priport SS 880" (Trademark), made by Ricoh Company, Ltd., and a printing test was carried out using a solid original.

The results are shown in Table 1.

EXAMPLES 2 and 3, AND COMPARATIVE EXAMPLES 1 and 2

The procedure for preparation of the thermosensitive stencil paper No. 1 according to the present invention employed in Example 1 was repeated except that the conditions of the tissue paper were changed as shown in Table 1, so that thermosensitive stencil papers No. 2 and No. 3 according to the present invention and comparative thermosensitive stencil papers No. 1 and No. 2 were prepared.

Using each of the above-prepared thermosensitive stencil papers, the printing test was carried out in the same manner as in Example 1.

The results are shown in Table 1.

TABLE 1

| | No. of Plant Elements in 100 cm² of Tissue Paper* | | | No. of White Spots in 100 cm² of Printed Matter** | | | Printed Solid Image Quality*** |
|---|---|---|---|---|---|---|---|
| | (1) | (2) | (3) | (1') | (2') | (3') | |
| Ex. 1 | 59 | 22 | 3 | 63 | 21 | 3 | O |
| Ex. 2 | 40 | 11 | 12 | 38 | 12 | 12 | O |
| Ex. 3 | 90 | 5 | 20 | 80 | 24 | 18 | O |
| Comp. Ex. 1 | 190 | 72 | 24 | 211 | 72 | 24 | X |
| Comp. Ex. 2 | 150 | 70 | 19 | 103 | 70 | 18 | X |

TABLE 1-continued

*(1) The number of plant elements having a maximum width ranging from 100 μm to 5 mm, a maximum length ranging from 100 μm to 5 mm, and an area of 7800 μm² or more in a 100 cm² area of the porous tissue paper.
(2) The number of plant elements having a maximum width ranging from 300 μm to 5 mm, a maximum length ranging from 300 μm to 5 mm, and an area of 70,000 μm² or more in a 100 cm² area of the porous tissue paper.
(3) The number of plant elements having a maximum width ranging from 300 μm to 5 mm, and a maximum length ranging from 1 mm to 5 mm in a 100 cm² area of the porous tissue paper.
**(1') The number of white spots with a width ranging from 100 μm to 5 mm, a length ranging from 100 μm to 5 mm, and an area of 7800 μm² or more in a 100 cm² area of the printed matter.
(2') The number of white spots with a width ranging from 300 μm to 5 mm, a length ranging from 300 μm to 5 mm, and an area of 70,000 μm² or more in a 100 cm² area of the printed matter.
(3') The number of white spots with a width ranging from 300 μm to 5 mm and a length ranging from 1 mm to 5 mm in a 100 cm² area of the printed matter.
***O . . . white spots are almost inconspicuous.
X . . . white spots are remarkably conspicuous.

What is claimed is:

1. A thermosensitive stencil paper comprising a porous tissue paper comprising a plurality of different plant elements (a) and (b), serving as a porous substrate, and a thermoplastic resin layer formed thereon:

plant elements (a) having a maximum width ranging from 100 μm to 5 mm, a maximum length ranging from 100 μm to 5 mm, and an area of 7800 μm² or more, when measured in such a posture that provides a maximum area of said plant element (a), being 150 or less in number in a 100 cm² area of said porous tissue paper; and plant elements (b) having a maximum width ranging from 300 μm to 5 mm, a maximum length ranging from 300 μm to 5 mm, and an area of 70,000 μm² or more, when measured in such a posture that provides a maximum area of said plant element, being 25 or less in number in a 100 cm² area of said porous tissue paper.

2. The thermosensitive stencil paper as claimed in claim 1, wherein said porous tissue paper further comprises plant elements having a maximum width ranging from 300 μm to 5 mm, a maximum length ranging from 1 mm to 5 mm, when measured in such a posture that provides a maximum area of said plant element, in a number of 15 or less in a 100 cm² area of said porous tissue paper.

* * * * *